US012118405B2

(12) United States Patent
Baughman et al.

(10) Patent No.: US 12,118,405 B2
(45) Date of Patent: Oct. 15, 2024

(54) EDGE FUNCTION-GUIDED ARTIFICIAL INTELLIGENCE REQUEST ROUTING

(71) Applicant: INTERNATIONAL BUSINESS MACHINES CORPORATION, Armonk, NY (US)

(72) Inventors: Aaron K. Baughman, Cary, NC (US); Gary William Reiss, Buford, GA (US); Michael Choong, Baton Rouge, LA (US); Kevin Lee Masters, Fuquay-Varina, NC (US); Stephen C. Hammer, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 676 days.

(21) Appl. No.: 17/389,641

(22) Filed: Jul. 30, 2021

(65) Prior Publication Data

US 2023/0033818 A1 Feb. 2, 2023

(51) Int. Cl.
G06F 9/50 (2006.01)
G06F 11/34 (2006.01)
G06N 20/00 (2019.01)

(52) U.S. Cl.
CPC .......... G06F 9/5072 (2013.01); G06F 9/5055 (2013.01); G06F 9/5077 (2013.01);
(Continued)

(58) Field of Classification Search
CPC .... G06F 9/5072; G06F 9/5055; G06F 9/5077; G06F 11/3409; G06F 2209/505;
(Continued)

(56) References Cited

U.S. PATENT DOCUMENTS

| 8,762,298 B1 | 6/2014 | Ranjan et al. |
| 9,736,054 B2 | 8/2017 | Bacthu et al. |
| 10,757,121 B2 | 8/2020 | Dasgupta et al. |

(Continued)

FOREIGN PATENT DOCUMENTS

| CN | 107291668 B | 10/2017 |
| CN | 110175680 A | 8/2019 |

(Continued)

OTHER PUBLICATIONS

International Search Report and Written Opinion for PCT/CN2022/095070, completed Jul. 18, 2022 (mailed Jul. 27, 2022), 9 pgs.

(Continued)

Primary Examiner — Kenneth Tang
(74) Attorney, Agent, or Firm — Rakesh Roy, Esq.; Matthew M. Hulihan, Esq.; Heslin Rothenberg Farley & Mesiti P.C.

(57) ABSTRACT

Edge function-guided artificial intelligence (AI) request routing is provided by applying a machine learning model to predictors of cloud endpoint hydration to determine hydration levels of cloud endpoints, of a hybrid cloud environment, that provide AI processing, determining, for each edge component of a plurality of edge components of the hybrid cloud environment and each cloud endpoint of the cloud endpoints, alternative flow paths between the edge component and the cloud endpoint, the alternative flow paths being differing routes for routing data between the edge component and the cloud endpoint, and the alternative flow paths being of varying flow rates determined based on the hydration levels of the cloud endpoints, and dynamically deploying edge functions on edge component(s), the edge functions configuring the edge component(s) to alternate among the alternative flow paths available in routing AI processing requests from the edge component(s) to target cloud endpoints of the cloud endpoints.

20 Claims, 5 Drawing Sheets

(52) U.S. Cl.
CPC ......... *G06F 11/3409* (2013.01); *G06N 20/00* (2019.01); *G06F 2209/505* (2013.01); *G06F 2209/508* (2013.01)

(58) Field of Classification Search
CPC .......... G06F 2209/508; G06F 11/3006; G06F 11/3433; G06N 20/00; G06N 3/098
See application file for complete search history.

(56) References Cited

U.S. PATENT DOCUMENTS

| | | | |
|---|---|---|---|
| 2016/0092686 A1* | 3/2016 | Barlett ................. | G06F 21/577 726/22 |
| 2020/0050951 A1 | 2/2020 | Wang et al. | |
| 2020/0120000 A1* | 4/2020 | Parthasarathy ......... | H04L 67/10 |
| 2020/0136920 A1* | 4/2020 | Doshi .................... | H04L 67/10 |
| 2020/0280587 A1 | 9/2020 | Janakiraman et al. | |
| 2020/0296155 A1* | 9/2020 | McGrath ............... | G06F 9/5027 |
| 2021/0117697 A1* | 4/2021 | Guim Bernat ....... | G08G 1/0133 |
| 2021/0136006 A1 | 5/2021 | Casey et al. | |
| 2021/0144517 A1* | 5/2021 | Guim Bernat ...... | H04L 41/0869 |
| 2021/0203565 A1 | 7/2021 | Arora et al. | |
| 2021/0281496 A1* | 9/2021 | Ezra .................... | H04L 41/5054 |
| 2021/0297355 A1* | 9/2021 | Bartholomew ....... | H04L 47/781 |
| 2023/0033818 A1* | 2/2023 | Baughman .......... | G06F 11/3006 |
| 2024/0113941 A1* | 4/2024 | Siddiqui ............. | H04L 41/0895 |

FOREIGN PATENT DOCUMENTS

| | | |
|---|---|---|
| CN | 110312277 A | 10/2019 |
| CN | 112087522 A | 12/2020 |
| CN | 112099510 A | 12/2020 |
| CN | 112990018 A | 6/2021 |
| WO | 2015103523 A1 | 7/2015 |

OTHER PUBLICATIONS

Subramanya, T., et al., "Machine Learning-Driven Scaling and Placement of Virtual Network Functions at the Network Edges," 2019 IEEE Conference on Network Softwarization (NetSoft), 2019. Retrieved on Jul. 21, 2021 from the Internet URL: <https://www.robertoriggio.net/papers/netsoft2019_ml.pdf>, pp. 414-422.

Qi, Q., et al., "Knowledge-Driven Service Offloading Decision for Vehicular Edge Computing: A Deep Reinforcement Learning Approach", IEEE Transactions on Vehicular Technology, vol. 68, No. 5, May 2019, 12 pgs.

Zhang, N., et al., "Low-Rate DOS Attack Detection Using PSD Based Entropy and Machine Learning," 2019 6th IEEE International Conference on Cyber Security and Cloud Computing (CSCloud) / 2019 5th IEEE International Conference on Edge Computing and Scalable Cloud (EdgeCom), 2019, 4 pgs.

King, T., et al., "Enabling Edge Devices that Learn from Each Other: Cross Modal Training for Activity Recognition", EdgeSys '18, Jun. 10-15, 2018. Retrieved on Jul. 21, 2021 from the Internet URL: <https://dl.acm.org/doi/pdf/10.1145/3213344.3213351>, pp. 37-42.

Li, Y., et al., "Traffic congestion assessment based on street level data for on-edge deployment", SEC '19: ACM/IEEE Symposium on Edge Computing, Nov. 7-9, 2019, Arlington, VA, USA. ACM, New York, NY, USA, 3 pgs.

Kar, G., "Real-time Trac Estimation at Vehicular Edge Nodes". In Proceedings of SEC '17, San Jose / Silicon Valley, CA, USA, Oct. 12-14, 2017, 12 pgs.

Mell, Peter, et al., "The NIST Definition of Cloud Computing", NIST Special Publication 800-145, Sep. 2011, Gaithersburg, MD, 7 pgs.

* cited by examiner

EDGE FUNCTION-GUIDED ARTIFICIAL INTELLIGENCE REQUEST ROUTING

BACKGROUND

Artificial intelligence (AI) processing refers to the execution of AI algorithms to process received requests. The processing usually generates outputs that are then sent back to the requesting entities. AI algorithms of an AI service are often executed in a cloud environment because of the flexibility and other advantages that it provides, particularly when the AI service is to handle a large number of requests, from a large number of unrelated entities, and in a relatively short amount of time. Example such AI services are 'smart assistants' or 'virtual assistants' like those offered by Google Inc., Apple Inc., and Amazon Inc. The AI algorithms themselves and the requests they are to handle can vary in complexity, and demand for the AI service can be unpredictable.

SUMMARY

Shortcomings of the prior art are overcome and additional advantages are provided through the provision of a computer-implemented method. The method applies a machine learning model to predictors of cloud endpoint hydration to determine hydration levels of cloud endpoints, of a hybrid cloud environment, that provide artificial intelligence (AI) processing. A hydration level of a cloud endpoint indicates a capacity of the cloud endpoint to service additional requests for AI processing. The method also determines, for each edge component of a collection of edge components of the hybrid cloud environment and each cloud endpoint of the cloud endpoints, alternative flow paths between the edge component and the cloud endpoint. The alternative flow paths are differing routes for routing data between the edge component and the cloud endpoint, and are of varying flow rates that are determined based on the hydration levels of the cloud endpoints. Additionally, the method dynamically deploys edge functions on edge component(s) of the collection of edge components. The edge functions configure the edge components to alternate among the alternative flow paths available in routing AI processing requests from the edge components to target cloud endpoints of the cloud endpoints.

Further, a computer system is provided that includes a memory and a processor in communication with the memory, wherein the computer system is configured to perform a method. The method applies a machine learning model to predictors of cloud endpoint hydration to determine hydration levels of cloud endpoints, of a hybrid cloud environment, that provide artificial intelligence (AI) processing. A hydration level of a cloud endpoint indicates a capacity of the cloud endpoint to service additional requests for AI processing. The method also determines, for each edge component of a collection of edge components of the hybrid cloud environment and each cloud endpoint of the cloud endpoints, alternative flow paths between the edge component and the cloud endpoint. The alternative flow paths are differing routes for routing data between the edge component and the cloud endpoint, and are of varying flow rates that are determined based on the hydration levels of the cloud endpoints. Additionally, the method dynamically deploys edge functions on edge component(s) of the collection of edge components. The edge functions configure the edge components to alternate among the alternative flow paths available in routing AI processing requests from the edge components to target cloud endpoints of the cloud endpoints.

Yet further, a computer program product including a computer readable storage medium readable by a processing circuit and storing instructions for execution by the processing circuit is provided for performing a method. The method applies a machine learning model to predictors of cloud endpoint hydration to determine hydration levels of cloud endpoints, of a hybrid cloud environment, that provide artificial intelligence (AI) processing. A hydration level of a cloud endpoint indicates a capacity of the cloud endpoint to service additional requests for AI processing. The method also determines, for each edge component of a collection of edge components of the hybrid cloud environment and each cloud endpoint of the cloud endpoints, alternative flow paths between the edge component and the cloud endpoint. The alternative flow paths are differing routes for routing data between the edge component and the cloud endpoint, and are of varying flow rates that are determined based on the hydration levels of the cloud endpoints. Additionally, the method dynamically deploys edge functions on edge component(s) of the collection of edge components. The edge functions configure the edge components to alternate among the alternative flow paths available in routing AI processing requests from the edge components to target cloud endpoints of the cloud endpoints.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
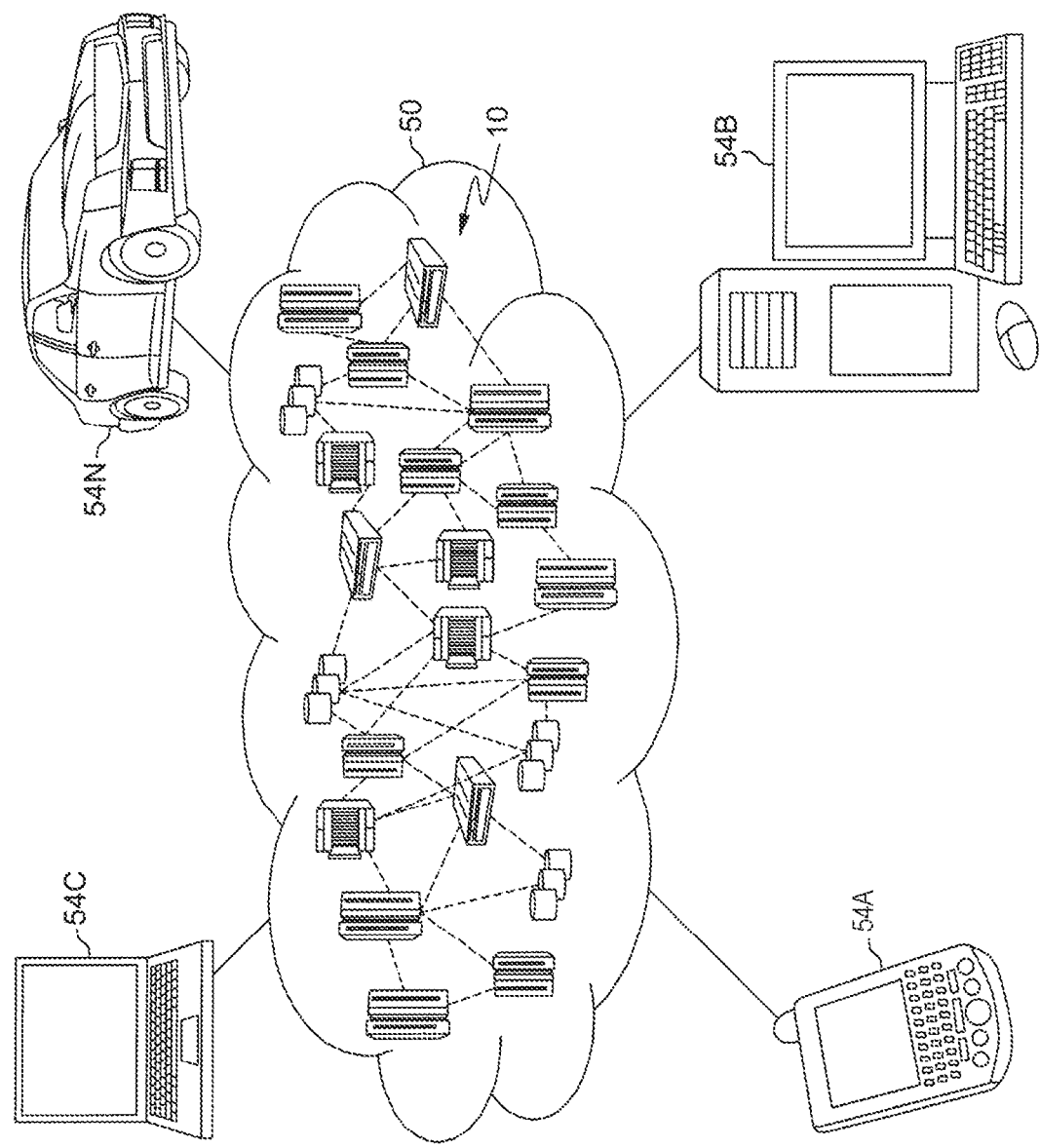
FIG. 1 depicts a cloud computing environment according to an embodiment of the present invention.

AI algorithms in particular applications, such as operations research problems like bin packing, path finding, and asset allocation, can take a relatively high amount of computing time to find a solution. Often complex AI algorithms have to be approximated or limited to handle a desired volume of requests. The system can be quickly overrun if unable to handle this volume of requests. In the context of some applications of AI, for instance live debater services, the AI processing can be very complex and take significant amounts of time. The resources available to provide the desired service are relatively scarce. A long-running search algorithm, for instance, is not able to run fast enough to serve millions of users at the same time. Some of the best solutions require additional compute cycles to find a set of optimal solutions. Meanwhile, online training of AI algorithms can also impede compute speed. Thrashing between thousands of apply requests during training can cause both the training and solution response processes to stall. One approach for limiting demand on AI algorithms it to impose timeouts or constraints to approximate solutions. Restrictions such as these are put in place for systems at scale to handle hundreds of thousands to billions of requests each day.

In addition, while new hardware for powerful neuromorphic and quantum computing is becoming increasingly available, these resources will initially be scarce because scarcity always follows a new cloud technology until economies of scale are gained. Even if a hardware architecture has saturated the market, groups have budget constraints that limit the size of their compute power.

Another problem is cloud resiliency. AI algorithms can be complex with several steps in the processing pipeline and could take down relatively lightweight computing components such as containers. In particular, combining high traffic with the complexities of AI processing and big data causes many edge cases of computer component failure to emerge.

Approaches described herein provide, in some aspects, routing of AI requests using edge functions deployed on edge components of a hybrid cloud environment in an effort to minimize edge case emergence around resource contention and AI approximation. This can help overcome lag in scaling-up a new technology, as an example. Processing by edge components, driven by edge functions deployed thereon, selects routes to use for routing requests to endpoints in order to maximize request processing. Aspects learn trends of algorithms within the context of computing neighbors and dynamically deploy edge functions across the hybrid cloud environment. For instance, a process can track algorithm performance over time relative to processing by neighboring compute components to learn how the AI algorithms perform in varying contexts and where performance stresses exist in the cloud network. Edge functions are dynamically provisioned to edge components in order to implement request handling in accordance with aspects described herein, which includes in some aspects alternating between available paths to a target endpoint. The routing of requests (for data, API calls, outputs, etc.) entering the hybrid cloud environment at an edge component to the appropriate AI algorithm for the best precision and performance can be important for delivering the best AI experience to consumers and enterprises. The software in the form of edge functions can be installed on edge components, for instance as a component on a serverless piece of virtualized computing allocated to specific function(s).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes. Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
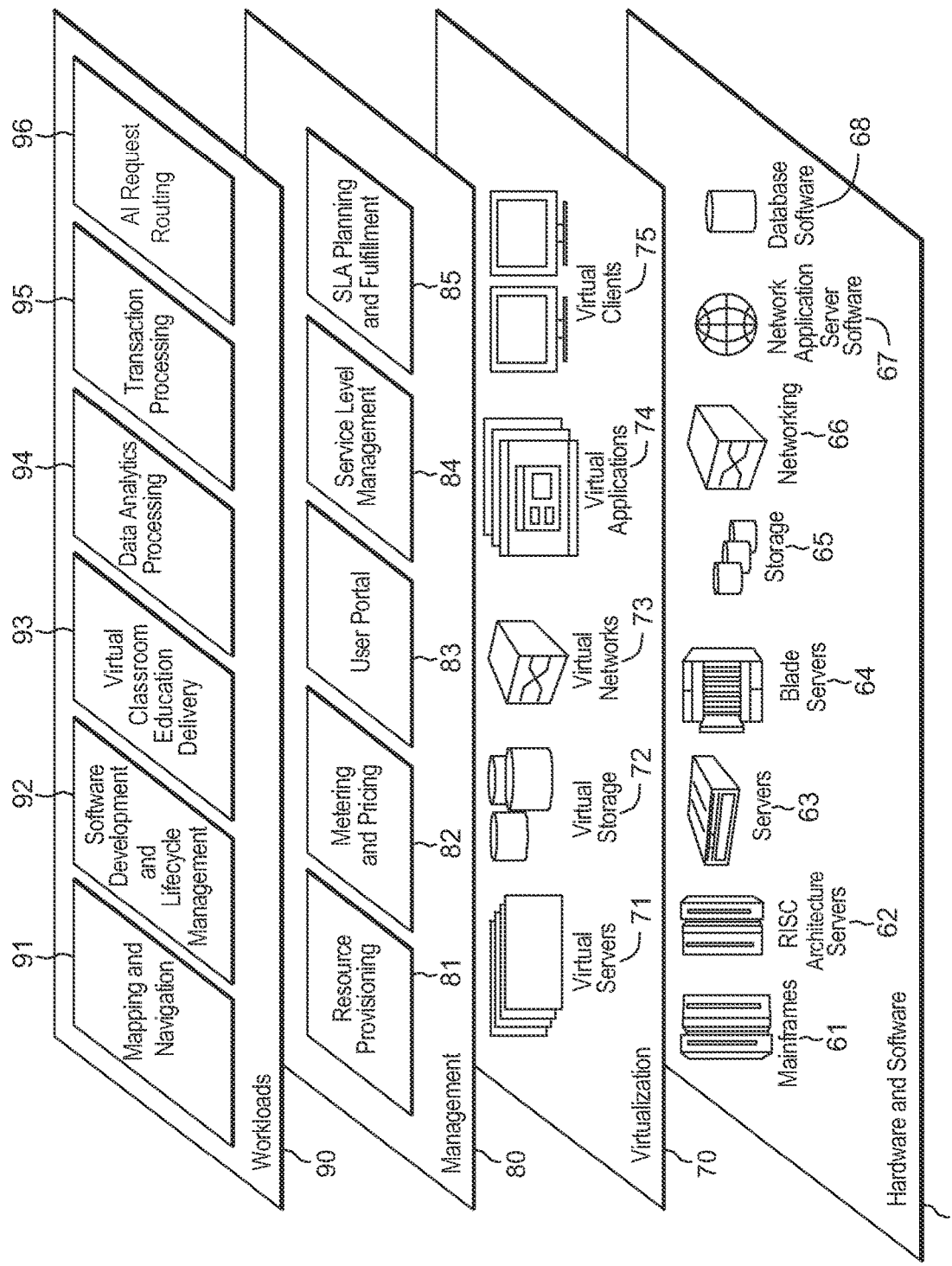
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge function-guided AI request routing 96.

Accordingly, a hybrid cloud environment, such as a cloud environment 50 of FIG. 1, can provide computing resources, such cloud endpoints, for servicing requests for AI processing. The requests can enter the cloud environment from request originators having software/applications installed thereon, for instance a virtual assistant, web browser, or other local application, that may request AI processing. Example request originators include, but are not limited to, client devices (for instance user computing systems) and other network(s) that are remote from the cloud environment. The requests might enter the cloud environment via one or more intervening networks/devices.

The periphery of the cloud environment, at which any request enters the cloud environment from an external component, is referred to as the edge of the cloud environment. At the cloud edge sit devices (gateways and load balancers for instance), provisioned services (usually virtualized), modules, etc., collectively referred to herein as edge components, that are what receive the requests as they enter the cloud environment. They then perform processing at this frontend and determine where to direct traffic. Requests are routed 'inward' to other components of the cloud environment, such as endpoints that host AI algorithms to perform AI processing. An endpoint can refer to a physical device itself, such as a physical server, or a virtual construct, such as a hosted container that is hosted on physical equipment, as examples. Endpoints host/provide AI processing/functions/algorithms. Such AI algorithms are commonly deployed as "Representational state transfer" (RESTful) services exposed as containers on a container orchestration architecture. Each endpoint consumes resources in its processing of AI requests routed to it, and is capable of receiving requests, performing processing to service the requests (which might involve reaching out to other components of the cloud environment or remote devices), and output responses. Typically a response would be provided back to the requesting entity via a path from the endpoint back to the edge component from which the request was routed, and then down to the request originator.

Edge network services (services that execute at the cloud environment network edge) are commonly provided as a cloud internet service (CIS) for clients looking to secure their internet-facing applications from, e.g., DDoS attacks, data theft and bot attacks, and/or clients needing to optimize their web applications and ensure global responsiveness and ongoing availability of their services. Edge functions provide for creation or modification of existing applications, without having to configure or maintain infrastructure, by using a serverless execution environment that is software-provisioned and implemented. Edge functions are programming code that are defined and uploaded to the edge components to process requests ultimately to be directed to an 'origin'. Origin refers to the key server/processing (AI processing in examples discussed herein) that a user/client requestor is requesting in presenting the AI processing request(s) to the cloud platform. As noted above, throttling is sometimes used to limit service throughput so that resource consumption (memory, processor, disk, network, etc.) in the system is at an acceptable level.

Figure 3:
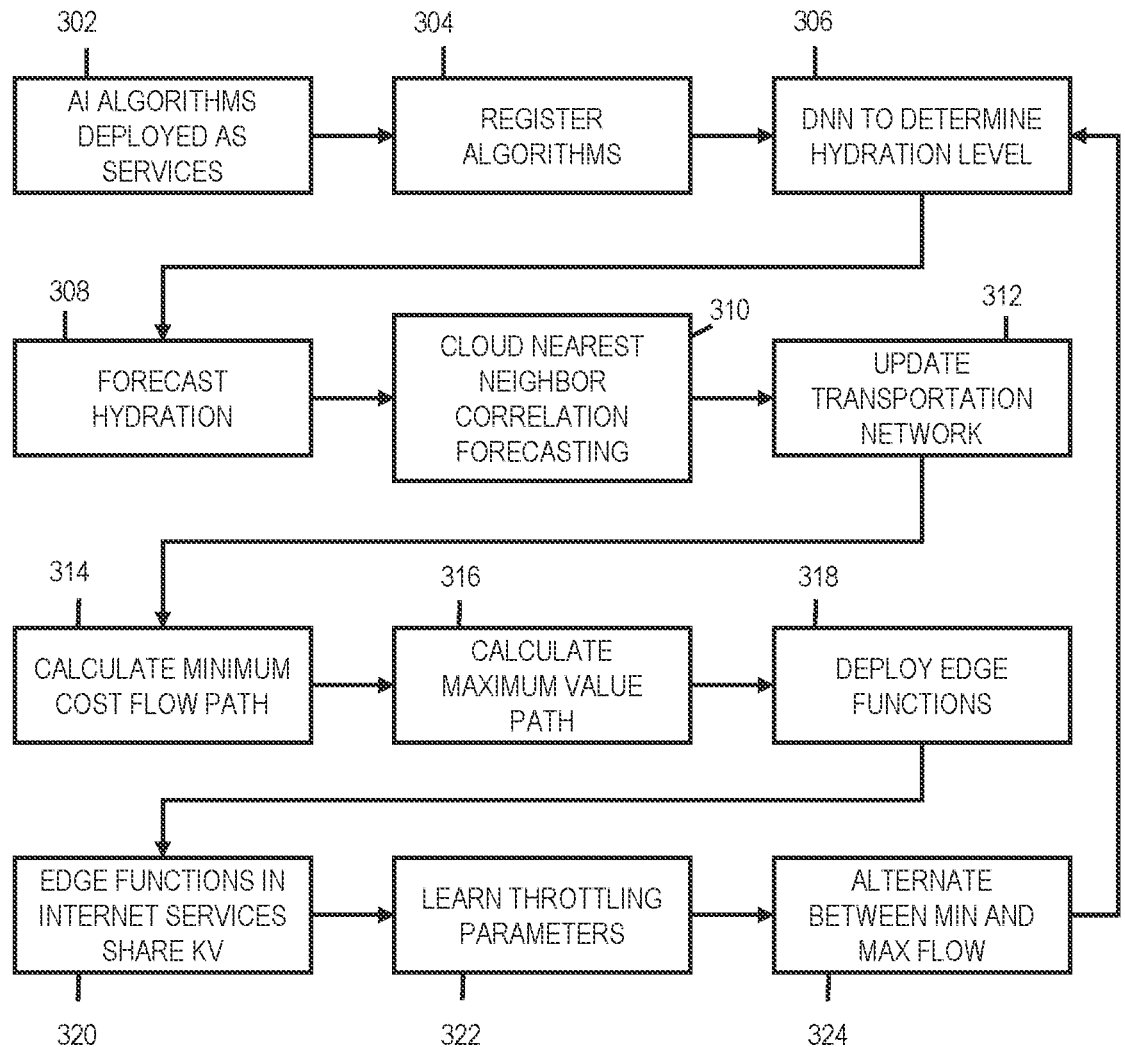
FIG. 3 depicts an example conceptual flow for edge function-guided artificial intelligence request routing, in accordance with aspects described herein.

FIG. 3 depicts an example conceptual flow for edge function-guided artificial intelligence request routing, in accordance with aspects described herein. Aspects of FIG. 3 can be performed by one or more computing systems, such as those of a cloud computing environment. Initially, AI algorithms are deployed (302) as services to endpoints of a cloud environment. The algorithms could be deployed as RESTful services implemented by containers, for instance. The cloud environment is a hybrid cloud environment in examples discussed herein, though it could be another type of cloud environment. Each endpoint consumes resources. Different endpoints could be configured (programmed) to provide different AI services (user experiences), though some endpoints could be effectively identical to each other in terms of the AI processing they perform. Specific AI algorithms/processing to process a given request can be selected based on the nature of the request and what the request is asking. Part of AI processing could include initial processing, by endpoints, to understand what the request is asking. For instance, in AI processing of requests submitted to virtual assistants, there may be some initial AI processing to perform speech-to-text conversation and natural language processing to convert user-provided input audio into understandable meanings that further AI processing can process to answer the user query. Depending on the request type, endpoint(s) used in processing the request can be selected accordingly. As an example, a request to a virtual assistant for updated sports scores might be routed to/though different endpoint(s) than would be a request to hear the weather in a particular location.

In some examples, different endpoints providing different AI processing might be used to satisfy even the same type of request. Using an example of an AI engine for intelligent debate with users, a first endpoint could be configured to perform AI-driven, deep response processing to provide a 'full response' to the AI request, while a second endpoint might be leveraged in times of request congestion to provide an approximated, limited, or canned response to the same request depending on whether the first endpoint is overloaded when the request is received. An edge component receiving the request from the requestor could perform intelligent processing to route the request along the proper route, i.e. to a proper endpoint. The edge components accomplish this in accordance with aspects discussed herein by way of edge functions that are deployed between the requesting devices and the AI processing endpoints, i.e. on edge components at a cloud environment edge. Since there may be differing paths between any given edge component and a target endpoint to route a request, the edge components can be programmed with edge functions to alternate between available paths according to aspects described herein.

Returning to FIG. 3, the AI algorithms are deployed and exposed as services (302) and registered (304) so that components of the cloud environment are aware of the AI algorithms and where they reside. This is used in routing requests to endpoints appropriate for handling such requests. At this point, the flow applies (306) a machine learning model, for instance a dynamic neural network (DNN), to predictors associated with different endpoints of the environment to determine a hydration level of each of those endpoints. The predictors used are features of the model. Example predictors are compute time of the endpoint, memory consumption of the endpoint, container size of container(s) of the endpoint, container run time of the endpoint, requests per unit of time (e.g. second) being handled by the endpoint, memory paging of the endpoint, AI processing compute cycles of the endpoint, and a textual summarization about the AI algorithm(s) performed by the endpoint. In this latter regard, a transformer model can examine inputs and outputs of an AI algorithm to generate a textual summarization (e.g. a few sentences) about the algorithm. Additionally or alternatively, AI deploy managers can supply a textual description about an AI algorithm upon algorithm registration.

The predictors are used by the model to determine and output (308) a hydration level indicative of how saturated the capabilities of the endpoint are with processing requests, e.g. a capacity of the cloud endpoint to service additional requests for AI processing. The hydration level reflects a hydration potential ('pH' level as used herein) of the endpoint.

In one specific example, hydration potential is expressed as Equation 1:

$$pH = -\log_{10}(a_{H^+}) = \log_{10}\left(\frac{1}{a_{H^+}}\right) \quad \text{(Equation 1)}$$

where $a_{H^+}$ is an accuracy level of the model. The Log base 10 converts this to a comparable pH level, or hydration.

pH can be used to indicate likelihood that traffic (requests) will be sent to the endpoint for which pH is determined; the higher the pH, the less likely it is that traffic will be sent to the endpoint.

Accuracy levels can be determined, for instance through burst testing based on performance of the model, and assigned to indicate how well the model correctly predicts hydration level given the set of predictors. These accuracy levels can be attached to the endpoints such that a collection of endpoint-specific predictor accuracy levels are determined, one for each endpoint, and used in hydration determination as illustrated by Equation 1 above.

Over time, trends in the pH and accuracy levels can be determined. Trended historical performance of the model in terms of its accuracy and trended hydration of the endpoints can be used to perform correlation forecasting (310) between endpoint pH and accuracy levels. For example, a process cross-correlates the endpoint-specific predictor accuracy levels for endpoints that provide similar AI algorithms and reside on a same subnet of the cloud environment. Similarly, the process cross-correlates the pH levels of endpoints that are provided on a same physical machine. The cross-correlations can be informative of the effects of nearest-neighbors on a cloud endpoint and therefore used in forecasting correlations between hydration level and predictor accuracy level for a given endpoint and hydration level(s) and predictor accuracy level(s) of other endpoint(s). This can be used in determining alternative flow paths for routing requests, as is described below.

The flow of FIG. 3 updates (312) properties of the transportation network (routes/paths between cloud environment nodes) based on the hydration and correlation forecasting, with particular focus on the flow rates between nodes. Flow rates between nodes refers generally to the available resources and capabilities to pass data (e.g. requests/request data and/or response/response data, for instance) between those nodes. More specifically, flow rate of a given node can refer to the amount of 'hits' per unit of time that the node can sustain, which is related to the node's hydration (pH) level as discussed above. An edge component has paths between it and the collection of nodes in the cloud environment and many times machine learning pipelines can be distributed across nodes in a pipeline. Sending data to an endpoint requires sending the data along one of the available paths and there may be multiple different, alternative paths available for the edge component to communicate with a given endpoint. A path from one node to another, for instance from an edge component to an endpoint hosting AI processing, might encompass one or more intervening nodes. The flow rate of a path between two nodes with intervening nodes along the path can therefore be a function of the capabilities (e.g. flow rate) of each node along the path, which includes flow rate of the target endpoint and any intervening nodes. Since nodes typically are not dedicated to routing/handling a single request at a time, there may be congestion, resource overutilization, or any other form of resource scarcity associated with a given path. Thus, some paths might be better than others in terms of speed/efficiency in communicating a request from one point in the cloud environment to another. Aspects can correlate pH (hydration) to a hits per second threshold and when that threshold is hit, the node can return 429 responses (too many requests), which can drive finding alternative paths for request communication.

After updating the transportation network at 312, the flow of FIG. 3 computes multiple path flows for one or more types of data/requests. For instance, the flow of FIG. 3 determines, with respect to an edge component and an endpoint to service a particular type of request, a flow path with a maximum flow rate as between the edge component and endpoint, based on the determined hydration/accuracy levels associated with the endpoint and any intervening nodes, and also determines a flow path with a minimum flow rate as between the edge component and endpoint. As an example, the path of minimum flow rate is likely to be the path with node(s) having relatively high hydration levels and low accuracy in terms of the model's prediction for those node(s).

The maximum and minimum flows will each be associated with a respective flow path of the different flow paths that exist between the edge component and the endpoint. Thus, there will be a maximum flow path and a minimum flow path. Two data plans—one for the maximum flow and one for the minimum flow—are therefore identified. In one aspect, the routing of requests from and by the edge component to the endpoint can be alternated between these two flow paths. 'Alternated' in this context does not necessarily mean alternating between maximum flow path and minimum flow path at each consecutive request that the edge component routes into the cloud environment to the given endpoint; instead, alternating refers to switching between/ among two or more paths to route request(s), where one or possibly more requests are routed down a selected path before switching to another path. As an example, one or more requests are routed along one (e.g. one of the maximum or minimum) flow path and then, based on some trigger, a next one or more requests are routed along another (e.g. the other of the minimum or maximum) flow path, and this repeats. This alternating, potentially among more than two available paths, can continue over a period of time, for instance when/if it is necessary to throttle distribution of incoming AI processing requests. Additionally, this practice of determining alternative flow paths between node pairs, determining their flow rates, and alternating between alternative flow paths as between any edge component-endpoint pair can be applied across several edge component-endpoint pairs of the cloud environment. A goal of the alternating when repeated across many edge components is to trenddownward the hydration levels of each of the endpoints over time such that saturation level of the endpoints becomes, on the whole, relatively high across the endpoints. In other words, the request routing processes of the edge components will select to utilize the minimum or maximum flow path to reach a given endpoint in order to trend the endpoint's saturation level higher and higher (lower the hydration level), and this applies to each of the endpoints to result in the most optimum resource usage. This can be a collective task by the different edge components receiving AI processing requests and to optimize resource usage across the collection of endpoints.

The proper routing of requests is achieved by edge functions deployed on the edge components to achieve smart, dynamic alternating between available flow paths such that, over time, hydration levels of the endpoints are lowered. It is noted that, over time and with an appreciable volume of requests, it is expected that the particular paths that are the minimum and maximum flow paths between an edge component and endpoint will change as path utilization alternates between the max/min paths available. It is expected that flow rates of the max/min flow paths vs. those of the paths 'in the middle' in terms of flow rate would converge, and the current max/min flow paths may change to other paths between the two nodes. It is also noted that edge functions can be selectively activated/deactivated based on desired throttling characteristics. As an example, rates of errors such as 429 errors might inform when to activate edge function(s) for alternating path selection. If initially the system processes relatively few requests, it may be desirable to utilize the most efficient paths possible when routing incoming requests (i.e. do not alternate between maximum and minimum flow paths for instance). But as the load on the system grows and incoming requests become too voluminous to handle fully, it may be desired based on throttling parameters to deploy, implement, and/or activate edge function(s) to perform the alternating between alternative flow paths.

Dynamic edge functions are deployed (318) across edge components (potentially hundreds of edge networks of the cloud environment) to sit in front of nodes of the cloud environment (i.e. between the nodes of the cloud and the requesting devices outside of the cloud) and route traffic as desired. In practice, the edge functions can share and use (320) a key-value store, for instance a distributed dictionary, of throttling knowledge that indicates situations in which to alternate between flow paths. Additionally, the flow of FIG. 3 learns (322) reinforced throttling parameters to know when to swap path plans (e.g. between minimum and maximum) based on sampling. Implementing this throttling can help minimize 429 (too many requests) errors that might occur on rate-exceeds.

The edge functions are configured to alternate among the alternative flow paths available in routing AI processing requests from the edge components to target cloud endpoints. In a specific example, an edge component alternates between (i) the path with the maximum flow rate to a given endpoint to handle a received AI processing request and (i) the path with the minimum flow rate to the given endpoint to handle the request.

Furthermore, the application of the model to determine hydration levels, performance of correlation forecasting, updating the transportation network, and the determination of the alternate paths between nodes can be repeated as indicated by the arrow in FIG. 3 returning to 306. Deployed edge functions can be moved, deleted, or updated, and/or additional edge functions can be deployed upon each such subsequent run of the path planning described.

Accordingly, aspects provide amorphous creation and deletion of edge functions based on maximum and minimum flow value paths, and switching of maximum and minimum value strategies based on learned distributed throttling. Embodiments provide AI service hydration prediction and hydration forecasting based on correlation to neighboring nodes to account for noisy neighbors. Throttling parameters for throttling requests for AI processing, the parameters indicating when to alternate between flow paths, can be shared among neighboring AI service edge functions and components by way of the key-value store. Further in some embodiments hydration can be trended based on natural language generation of AI algorithm summaries and input/output.

Figure 4:
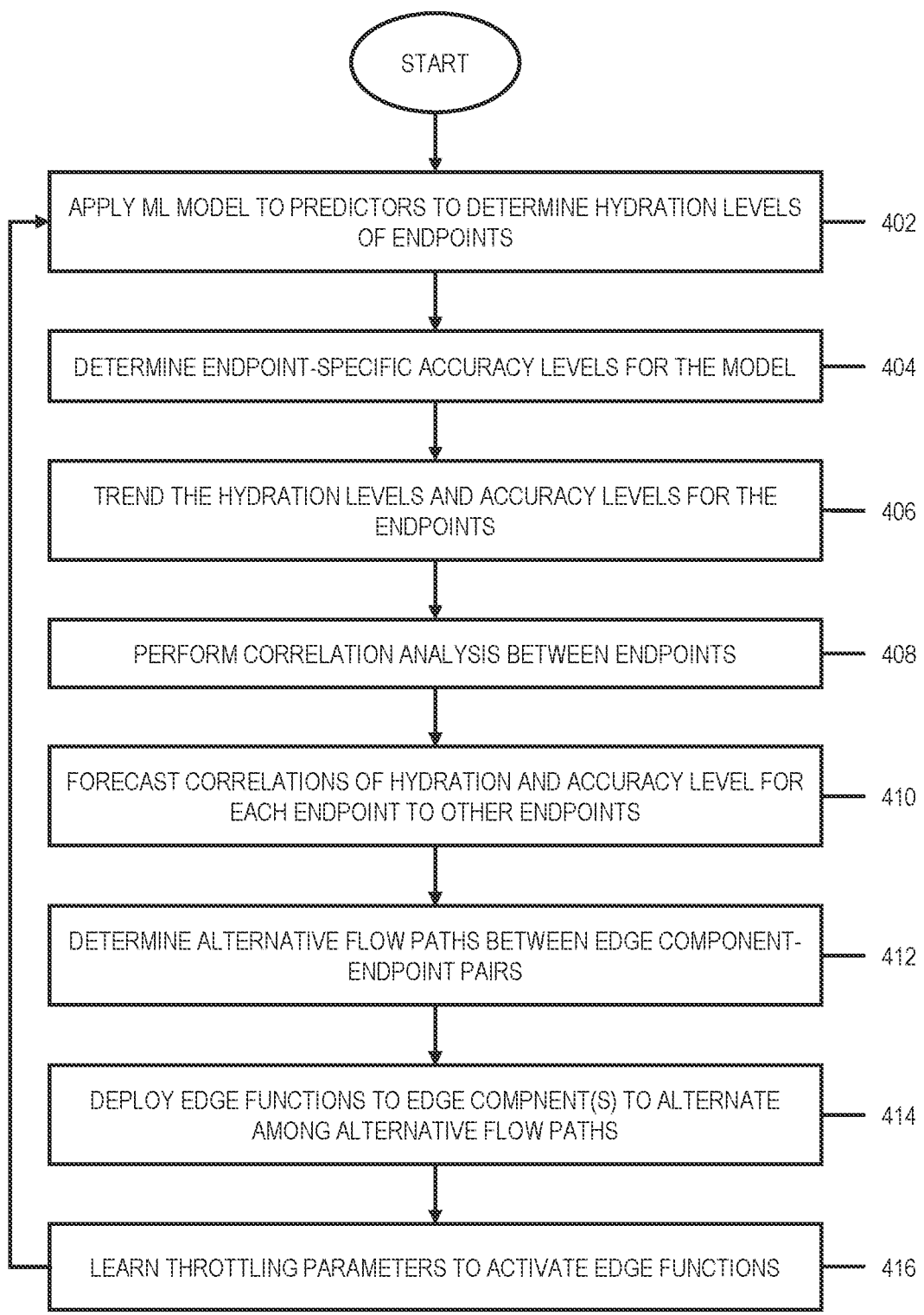
FIG. 4 depicts an example process for edge function-guided artificial intelligence request routing, in accordance with aspects described herein.

FIG. 4 depicts an example process for edge function-guided AI request routing in accordance with aspects described herein. In some examples, the process is performed by one or more computer systems, such as those described herein, which may include one or more components/computer systems of a cloud environment and/or one or more other computer systems.

The process applies (402) a machine learning model, such as a dynamic neural network, to predictors of cloud endpoint hydration to determine hydration levels of a plurality of cloud endpoints, of a hybrid cloud environment, that provide artificial intelligence (AI) processing. Hydration level of a cloud endpoint indicates a capacity of the cloud endpoint to service additional requests for AI processing. The predictors are features of the model. Example predictors of cloud endpoint hydration of a cloud endpoint include compute times of the cloud endpoint, memory consumption of the cloud endpoint, container size of the cloud endpoint, container run time of the cloud endpoint, requests per unit of time of the cloud endpoint, paging of the cloud endpoint, AI processing compute cycles of the cloud endpoint, and/or a textual summarization of one or more AI algorithms performed by the cloud endpoint. In some examples, the model, in determining hydration level of a cloud endpoint, accounts for trends in AI processing performance of the cloud endpoint as they may be influenced/dependent on workload processing (such as other request processing) of compute components that are neighbors of the cloud endpoint in the cloud environment.

The process of FIG. 4 also determines (404) endpoint-specific predictor accuracy levels for the model, which indicate how accurately the model determines hydration levels of the plurality of cloud endpoints. Each of the endpoint-specific predictor accuracy levels indicates an accuracy of the model in predicting hydration level of a specific cloud endpoint of the plurality of cloud endpoints. The process trends (406) the hydration levels of the plurality of cloud endpoints and the endpoint-specific predictor accuracy levels over time as incoming requests for AI processing requests are received and serviced by the hybrid cloud environment. At this point, the process performs correlation analyses (408) as between endpoints. For instance, the process performs, based on the trended endpoint-specific predictor accuracy levels, first correlation analysis as between endpoint-specific predictor accuracy levels, of the endpoint-specific predictor accuracy levels, for cloud endpoints, of the plurality of cloud endpoints, in a common subnet of the hybrid cloud environment that perform related AI algorithms. In other words, for endpoints that are in the same subnet and that perform similar, same, related, etc. AI algorithms, correlation analysis are performed as between the predictor accuracy levels associated with the endpoints to determine whether there are any correlations in accuracy levels among endpoints. The process also performs, based on the trended hydration levels, second correlation analysis as between hydration levels of cloud endpoints, of the plurality of cloud endpoints, hosted on a common physical computing device. In other words, for endpoints hosted on a same physical computing device, a correlation analysis is performed as between the hydration levels of those endpoints to determine whether there are any correlations in hydration levels among endpoints.

Based on the hydration level and accuracy level trending, and the first and second correlation analyses, the process forecasts correlations (410) of hydration level and predictor accuracy level for each cloud endpoint of the plurality of cloud endpoints to hydration levels and predictor accuracy levels of other cloud endpoints of the plurality of cloud endpoints. In other words, for each of one or more endpoints, the process forecasts correlations of hydration level and accuracy level for that endpoint to one or more other endpoints in the environment.

The process then determines (412), for each edge component of a plurality of edge components of the hybrid cloud environment and each cloud endpoint of the plurality of cloud endpoints (i.e. for each edge component-endpoint pair), alternative flow paths that exist as between the edge component and the cloud endpoint. The alternative flow paths are differing routes for routing data between the edge component and the cloud endpoint, and therefore the alternative flow paths are of varying flow rates. The flow rates can be determined based at least in part on the hydration levels and/or accuracy levels of the plurality of cloud endpoints. Among the determined alternative flow paths is a maximum flow path having maximum flow rate (i.e. of all of the flow paths existing) between the edge component and endpoint and a minimum flow path having minimum flow rate (i.e. of all of the flow paths existing) between the edge component and endpoint. This determining of the alternative flow paths can use the forecasted correlations in determining the flow rates for the alternative flow paths as between edge components and the cloud endpoint.

The process also dynamically deploys (414) edge functions on edge component(s) of those of the cloud environment, the edge functions configuring the edge component(s) to alternate among the alternative flow paths available in routing AI processing requests from the edge component(s) to target cloud endpoints of the plurality of cloud endpoints. For instance, for any such edge component, deployed edge function(s) configure that edge component to, when routing AI processing requests from the edge component to a selected endpoint, alternate among two or more of the alternative flow paths available to route AI processing requests between the edge component and the endpoint. The edge functions to dynamically deploy can be configured to trend-downward the hydration levels of each of the plurality of cloud endpoints over time. In other words, the edge functions can be configured such that, over time, the hydration levels across the cloud endpoints trend downward.

The process can also learn (416) throttling parameters for throttling incoming requests for AI processing, where the throttling parameters indicating when to alternate between flow paths of the alternative flow paths between an edge component and a target cloud endpoint. For instance, the throttling parameters might indicate a threshold of 429 errors at which some edge functions will be activated for alternative flow path routing in accordance with aspects described herein. The alternating can, for instance, alternate between the maximum flow path and the minimum flow path in routing incoming AI processing requests from the edge component to the cloud endpoint. The alternating among the alternative flow paths in routing AI processing requests from an edge component to a target cloud endpoint can include initially routing a sequence of consecutive incoming requests for AI processing along a first selected flow path of the alternative flow paths between the edge component and the target cloud endpoint, and changing, based on satisfaction of a throttling parameter, to a second selected flow path, different from the first selected flow path, of the alternative flow paths between the edge component and the target cloud endpoint in routing a next sequence of consecutive incoming requests for AI processing along the second selected flow path. Thus, the alternating need not alternate to a different flow path with each incoming request to go from the edge component to a target endpoint.

Additional aspects include maintaining the edge functions deployed on the edge component(s), and therefore the process in this example returns to 402. The process can re-determine hydration levels of the cloud endpoints over time as incoming requests for AI processing are serviced by the hybrid cloud environment, re-determine the alternative flow paths based on the updated hydration levels, and then, as part of deploying edge functions (414), dynamically implement changes to the deployed edge functions based on the updating. The changes can include, for instance, adding an edge function to an edge component, deleting an edge function from an edge component, moving an edge function of the deployed edge functions from one edge component to another edge component, and/or modifying an edge function of the edge functions.

Although various examples are provided, variations are possible without departing from a spirit of the claimed aspects.

Figure 5:
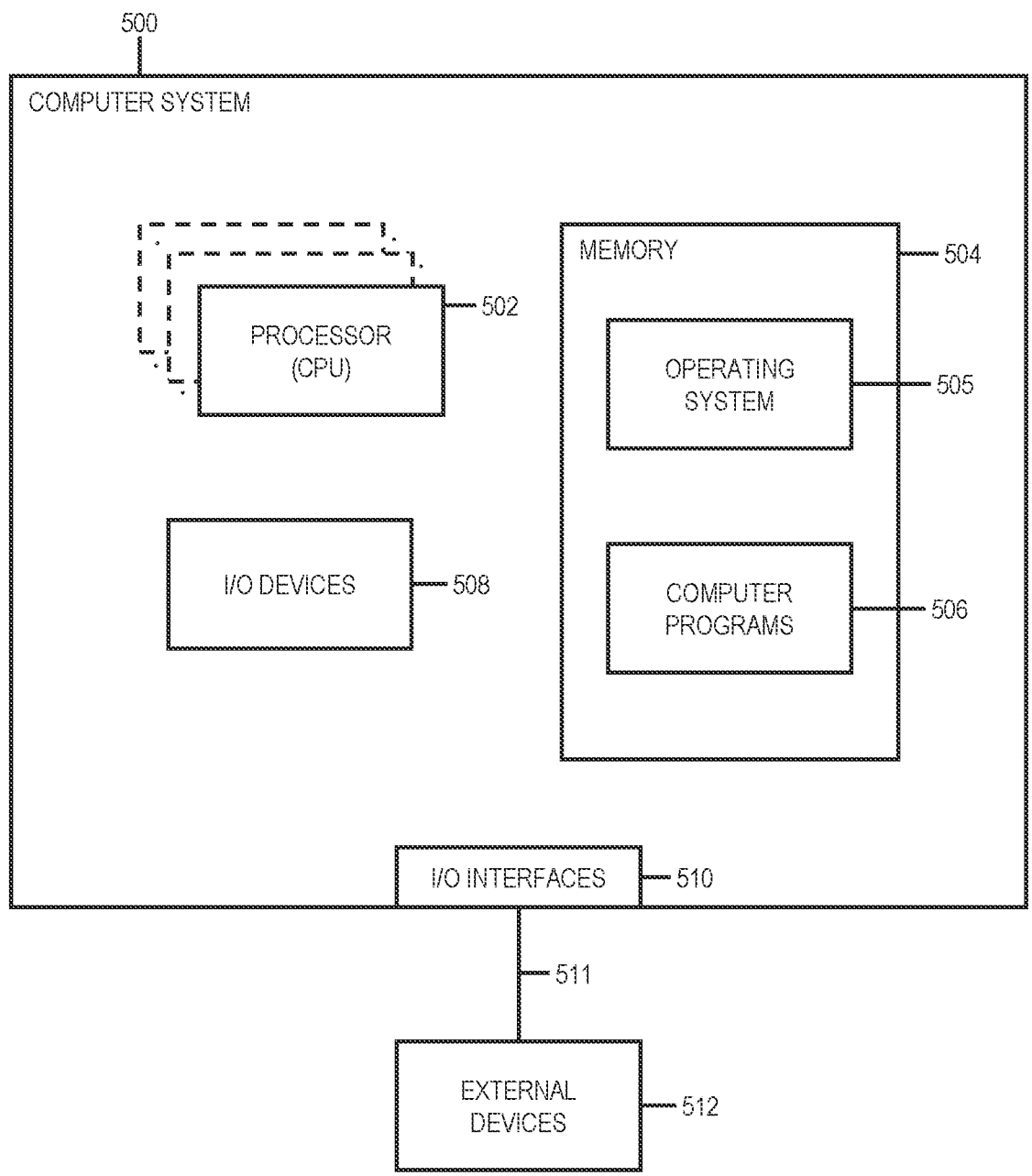
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
applying a machine learning model to predictors of cloud endpoint hydration to determine hydration levels of a plurality of cloud endpoints, of a hybrid cloud environment, that provide artificial intelligence (AI) processing, wherein a hydration level of a cloud endpoint indicates a capacity of the cloud endpoint to service additional requests for AI processing;
determining, for each edge component of a plurality of edge components of the hybrid cloud environment and each cloud endpoint of the plurality of cloud endpoints, alternative flow paths between the edge component and the cloud endpoint, the alternative flow paths being differing routes for routing data between the edge component and the cloud endpoint, and the alternative flow paths being of varying flow rates determined based at least in part on the hydration levels of the plurality of cloud endpoints; and
dynamically deploying edge functions on one or more edge components of the plurality of edge components, the edge functions configuring the one or more edge components to alternate among the alternative flow paths available in routing AI processing requests from the one or more edge components to target cloud endpoints of the plurality of cloud endpoints, wherein a maximum flow path having a maximum flow rate among the alternative flow paths and a minimum flow path having a minimum flow rate among the alternative flow paths are included in the alternative flow paths among which the one or more edge components are configured to alternate.

2. The method of claim 1, further comprising determining endpoint-specific predictor accuracy levels for the model that indicate how accurately the model determines hydration levels of the plurality of cloud endpoints, each of the endpoint-specific predictor accuracy levels indicating an accuracy of the model in predicting hydration level of a specific cloud endpoint of the plurality of cloud endpoints.

3. The method of claim 2, further comprising:
trending the hydration levels of the plurality of cloud endpoints and the endpoint-specific predictor accuracy levels over time as incoming requests for AI processing requests are received and serviced by the hybrid cloud environment;

performing, based on the trended endpoint-specific predictor accuracy levels, first correlation analysis as between endpoint-specific predictor accuracy levels, of the endpoint-specific predictor accuracy levels, for cloud endpoints, of the plurality of cloud endpoints, in a common subnet of the hybrid cloud environment that perform related AI algorithms;

performing, based on the trended hydration levels, second correlation analysis as between hydration levels of cloud endpoints, of the plurality of cloud endpoints, hosted on a common physical computing device; and based on the trending and the first and second correlation analyses, forecasting correlations of hydration level and predictor accuracy level for a cloud endpoint of the plurality of cloud endpoints to hydration levels and predictor accuracy levels of other cloud endpoints of the plurality of cloud endpoints, wherein the determining the alternative flow paths uses the forecasted correlations in determining the flow rates for the alternative flow paths as between edge components and the cloud endpoint.

4. The method of claim 1, wherein the predictors of cloud endpoint hydration of a cloud endpoint of the plurality of cloud endpoints comprise at least one selected from the group consisting of: compute times of the cloud endpoint, memory consumption of the cloud endpoint, container size of the cloud endpoint, container run time of the cloud endpoint, requests per unit of time of the cloud endpoint, paging of the cloud endpoint, AI processing compute cycles of the cloud endpoint, and a textual summarization of one or more AI algorithms performed by the cloud endpoint.

5. The method of claim 1, wherein the edge functions to dynamically deploy are configured to trend-downward the hydration levels of each of the plurality of cloud endpoints over time.

6. The method of claim 1, further comprising learning throttling parameters for throttling incoming requests for AI processing, the throttling parameters indicating when to alternate between flow paths of the alternative flow paths between an edge component and a target cloud endpoint.

7. The method of claim 6, wherein alternating among the alternative flow paths in routing AI processing requests from an edge component to a target cloud endpoint comprises initially routing a sequence of consecutive incoming requests for AI processing along a first selected flow path of the alternative flow paths between the edge component and the target cloud endpoint, and changing, based on satisfaction of a throttling parameter, to a second selected flow path, different from the first selected flow path, of the alternative flow paths between the edge component and the target cloud endpoint in routing a next sequence of consecutive incoming requests for AI processing along the second selected flow path.

8. The method of claim 1, wherein the alternative flow paths between an edge component of the plurality of end components and a cloud endpoint of the plurality of cloud endpoints comprise the maximum flow path and the minimum flow path, and wherein the alternating alternates between the maximum flow path and the minimum flow path in routing incoming AI processing requests from the edge component to the cloud endpoint.

9. The method of claim 1, further comprising maintaining the edge functions deployed on the one or more edge components, the maintaining comprising:

re-determining the hydration levels of the plurality of cloud endpoints over time as incoming requests for AI processing are serviced by the hybrid cloud environment;

re-determining the alternative flow paths based at least on the updated hydration levels; and dynamically implementing changes to the deployed edge functions based on the updating, the dynamically implemented changes comprising at least one selected from the group consisting of: adding an edge function to an edge component of the plurality of edge components, deleting an edge function from an edge component of the plurality of edge components, moving an edge function of the edge functions from one edge component of the plurality of edge components to another edge component of the plurality of edge components, and modifying an edge function of the edge functions.

10. The method of claim 1, wherein the model, in determining hydration level of a cloud endpoint, accounts for trends in AI processing performance of the cloud endpoint as dependent on workload processing of neighboring compute components of the cloud endpoint.

11. A computer system comprising:

a memory; and a processor in communication with the memory, wherein the computer system is configured to perform a method comprising:

applying a machine learning model to predictors of cloud endpoint hydration to determine hydration levels of a plurality of cloud endpoints, of a hybrid cloud environment, that provide artificial intelligence (AI) processing, wherein a hydration level of a cloud endpoint indicates a capacity of the cloud endpoint to service additional requests for AI processing;

determining, for each edge component of a plurality of edge components of the hybrid cloud environment and each cloud endpoint of the plurality of cloud endpoints, alternative flow paths between the edge component and the cloud endpoint, the alternative flow paths being differing routes for routing data between the edge component and the cloud endpoint, and the alternative flow paths being of varying flow rates determined based at least in part on the hydration levels of the plurality of cloud endpoints; and dynamically deploying edge functions on one or more edge components of the plurality of edge components, the edge functions configuring the one or more edge components to alternate among the alternative flow paths available in routing AI processing requests from the one or more edge components to target cloud endpoints of the plurality of cloud endpoints wherein a maximum flow path having a maximum flow rate among the alternative flow paths and a minimum flow path having a minimum flow rate among the alternative flow paths are included in the alternative flow paths among which the one or more edge components are configured to alternate.

12. The computer system of claim 11, wherein the method further comprises determining endpoint-specific predictor accuracy levels for the model that indicate how accurately the model determines hydration levels of the plurality of cloud endpoints, each of the endpoint-specific predictor accuracy levels indicating an accuracy of the model in predicting hydration level of a specific cloud endpoint of the plurality of cloud endpoints.

13. The computer system of claim 12, wherein the method further comprises:
- trending the hydration levels of the plurality of cloud endpoints and the endpoint-specific predictor accuracy levels over time as incoming requests for AI processing requests are received and serviced by the hybrid cloud environment;
- performing, based on the trended endpoint-specific predictor accuracy levels, first correlation analysis as between endpoint-specific predictor accuracy levels, of the endpoint-specific predictor accuracy levels, for cloud endpoints, of the plurality of cloud endpoints, in a common subnet of the hybrid cloud environment that perform related AI algorithms;
- performing, based on the trended hydration levels, second correlation analysis as between hydration levels of cloud endpoints, of the plurality of cloud endpoints, hosted on a common physical computing device; and
- based on the trending and the first and second correlation analyses, forecasting correlations of hydration level and predictor accuracy level for a cloud endpoint of the plurality of cloud endpoints to hydration levels and predictor accuracy levels of other cloud endpoints of the plurality of cloud endpoints, wherein the determining the alternative flow paths uses the forecasted correlations in determining the flow rates for the alternative flow paths as between edge components and the cloud endpoint.

14. The computer system of claim 11, wherein the method further comprises learning throttling parameters for throttling incoming requests for AI processing, the throttling parameters indicating when to alternate between flow paths of the alternative flow paths between an edge component and a target cloud endpoint.

15. The computer system of claim 11, wherein the alternative flow paths between an edge component of the plurality of end components and a cloud endpoint of the plurality of cloud endpoints comprise the maximum flow path and the minimum flow path, and wherein the alternating alternates between the maximum flow path and the minimum flow path in routing incoming AI processing requests from the edge component to the cloud endpoint.

16. A computer program product comprising:
- a computer readable storage medium readable by a processing circuit and storing instructions for execution by the processing circuit for performing a method comprising:
  - applying a machine learning model to predictors of cloud endpoint hydration to determine hydration levels of a plurality of cloud endpoints, of a hybrid cloud environment, that provide artificial intelligence (AI) processing, wherein a hydration level of a cloud endpoint indicates a capacity of the cloud endpoint to service additional requests for AI processing;
  - determining, for each edge component of a plurality of edge components of the hybrid cloud environment and each cloud endpoint of the plurality of cloud endpoints, alternative flow paths between the edge component and the cloud endpoint, the alternative flow paths being differing routes for routing data between the edge component and the cloud endpoint, and the alternative flow paths being of varying flow rates determined based at least in part on the hydration levels of the plurality of cloud endpoints; and
  - dynamically deploying edge functions on one or more edge components of the plurality of edge components, the edge functions configuring the one or more edge components to alternate among the alternative flow paths available in routing AI processing requests from the one or more edge components to target cloud endpoints of the plurality of cloud endpoints, wherein a maximum flow path having a maximum flow rate among the alternative flow paths and a minimum flow path having a minimum flow rate among the alternative flow paths are included in the alternative flow paths among which the one or more edge components are configured to alternate.

17. The computer program product of claim 16, wherein the method further comprises determining endpoint-specific predictor accuracy levels for the model that indicate how accurately the model determines hydration levels of the plurality of cloud endpoints, each of the endpoint-specific predictor accuracy levels indicating an accuracy of the model in predicting hydration level of a specific cloud endpoint of the plurality of cloud endpoints.

18. The computer program product of claim 17, wherein the method further comprises:
- trending the hydration levels of the plurality of cloud endpoints and the endpoint-specific predictor accuracy levels over time as incoming requests for AI processing requests are received and serviced by the hybrid cloud environment;
- performing, based on the trended endpoint-specific predictor accuracy levels, first correlation analysis as between endpoint-specific predictor accuracy levels, of the endpoint-specific predictor accuracy levels, for cloud endpoints, of the plurality of cloud endpoints, in a common subnet of the hybrid cloud environment that perform related AI algorithms;
- performing, based on the trended hydration levels, second correlation analysis as between hydration levels of cloud endpoints, of the plurality of cloud endpoints, hosted on a common physical computing device; and
- based on the trending and the first and second correlation analyses, forecasting correlations of hydration level and predictor accuracy level for a cloud endpoint of the plurality of cloud endpoints to hydration levels and predictor accuracy levels of other cloud endpoints of the plurality of cloud endpoints, wherein the determining the alternative flow paths uses the forecasted correlations in determining the flow rates for the alternative flow paths as between edge components and the cloud endpoint.

19. The computer program product of claim 16, wherein the method further comprises learning throttling parameters for throttling incoming requests for AI processing, the throttling parameters indicating when to alternate between flow paths of the alternative flow paths between an edge component and a target cloud endpoint.

20. The computer program product of claim 16, wherein the alternative flow paths between an edge component of the plurality of end components and a cloud endpoint of the plurality of cloud endpoints comprise the maximum flow path and the minimum flow path, and wherein the alternating alternates between the maximum flow path and the minimum flow path in routing incoming AI processing requests from the edge component to the cloud endpoint.

* * * * *